United States Patent [19]

Nakashima et al.

[11] Patent Number: 5,037,211

[45] Date of Patent: Aug. 6, 1991

[54] APPARATUS FOR MEASURING TEMPERATURE OF MOLTEN METAL

[75] Inventors: Mitsukane Nakashima; Toshio Iwama, both of Aichi, Japan

[73] Assignee: Meichuseiki Kabushiki Kaisha, Nagoya, Japan

[21] Appl. No.: 427,208

[22] Filed: Oct. 24, 1989

[30] Foreign Application Priority Data

Jun. 29, 1989 [JP] Japan ..................... 1-76578

[51] Int. Cl.⁵ .......................... G01K 13/12; G01K 1/12
[52] U.S. Cl. .................................. 374/139; 73/864.53; 73/DIG. 9
[58] Field of Search .................... 374/139, 179; 73/864.53, DIG. 9; 136/234

[56] References Cited

U.S. PATENT DOCUMENTS

| | | | |
|---|---|---|---|
| 2,397,901 | 4/1946 | Zimmerman | 374/139 |
| 3,115,781 | 12/1963 | Shearman | 374/139 |
| 3,267,732 | 8/1966 | Hance | 73/DIG. 9 |
| 3,580,078 | 5/1971 | MacKenzie | 374/139 |
| 3,610,045 | 4/1965 | Shearman | 374/139 |
| 3,844,172 | 10/1974 | Jeric | 73/DIG. 9 |
| 4,377,347 | 3/1983 | Hanmyo et al. | 374/139 |
| 4,570,496 | 2/1986 | Falk | 374/139 |

FOREIGN PATENT DOCUMENTS

| | | | |
|---|---|---|---|
| 0026039 | 2/1984 | Japan | 374/139 |
| 1257489 | 9/1986 | U.S.S.R. | 374/139 |

*Primary Examiner*—William A. Cuchlinski, Jr.
*Assistant Examiner*—Diego F. F. Gutierrez
*Attorney, Agent, or Firm*—Armstrong, Nikaido, Marmelstein, Kubovcik, & Murray

[57] ABSTRACT

An apparatus for measuring a temperature of molten metal includes a temperature measuring member which has a thermocouple covered wtih a protecting insulator, and a refractory molten metal cup in which molten metal to be measured is poured and which has a pipe portion in which the temperature measuring member can be repeatably detachably inserted.

1 Claim, 2 Drawing Sheets

APPARATUS FOR MEASURING TEMPERATURE OF MOLTEN METAL

BACKGROUND OF THE INVENTION

1. Field of the Invention

The present invention relates to an apparatus for measuring a temperature of molten metal, and more precisely, it relates to an improved apparatus having a measuring cup having therein a thermoelectric couple for measuring a temperature.

2. Description of the Related Art

Upon preparing a cooling curve which is used to analyze components of molten metal which is performed as one of a numeral of test on molten metal (e.g. cast iron) in front of a furnace, molten metal to be measured is put in a measuring cup which is made of a refractory material, so that the temperature of the molten metal is measured by a thermocouple.

FIG. 4 shows a known temperature measuring cup 50 of a molten metal which has a refractory cup body 51. The cup body 51 has therein a thermocouple 52 covered with an insulator 53 for measuring a temperature of a molten metal. The thermocouple 52 can be connected to an electrical power source (not shown) through a conductor 55 of a plug-in projection 54 which is provided on the bottom of the body 51 and which can be inserted in a receptacle or socket (not shown) connected to the electrical power source.

Conventional measuring cups as shown in FIG. 4 are consumables which are disposed of after each measurement.

The measurements of molten metal are frequently effected, and accordingly a large number of measuring cups having thermocouples, which are relatively expensive, must be prepared, resulting in an increased manufacturing cost and a waste of natural resources.

SUMMARY OF THE INVENTION

The primary object of the present invention is to eliminate the drawbacks of the prior art as mentioned above by providing an improved temperature measuring apparatus having a thermocouple which can be repeatedly used.

To achieve the objective mentioned above, according to the present invention, there is provided an apparatus for measuring a temperature of molten metal comprising a temperature measuring member which has a thermocouple covered with a protecting insulator, and a refractory molten metal cup in which a molten metal to be measured is poured and which has a pipe portion in which the temperature measuring member can be detachably inserted.

With this arrangement, since the temperature measuring member is made of a separate piece from the molten metal cup, the cup can be disconnected from the temperature measuring member after use, and accordingly the temperature measuring member, which is relatively expensive, can be repeatedly used.

BRIEF DESCRIPTION OF THE DRAWINGS

The invention will be described below in detail with reference to the accompanying drawings, in which.

DESCRIPTION OF PREFERRED EMBODIMENTS

Figure 1:
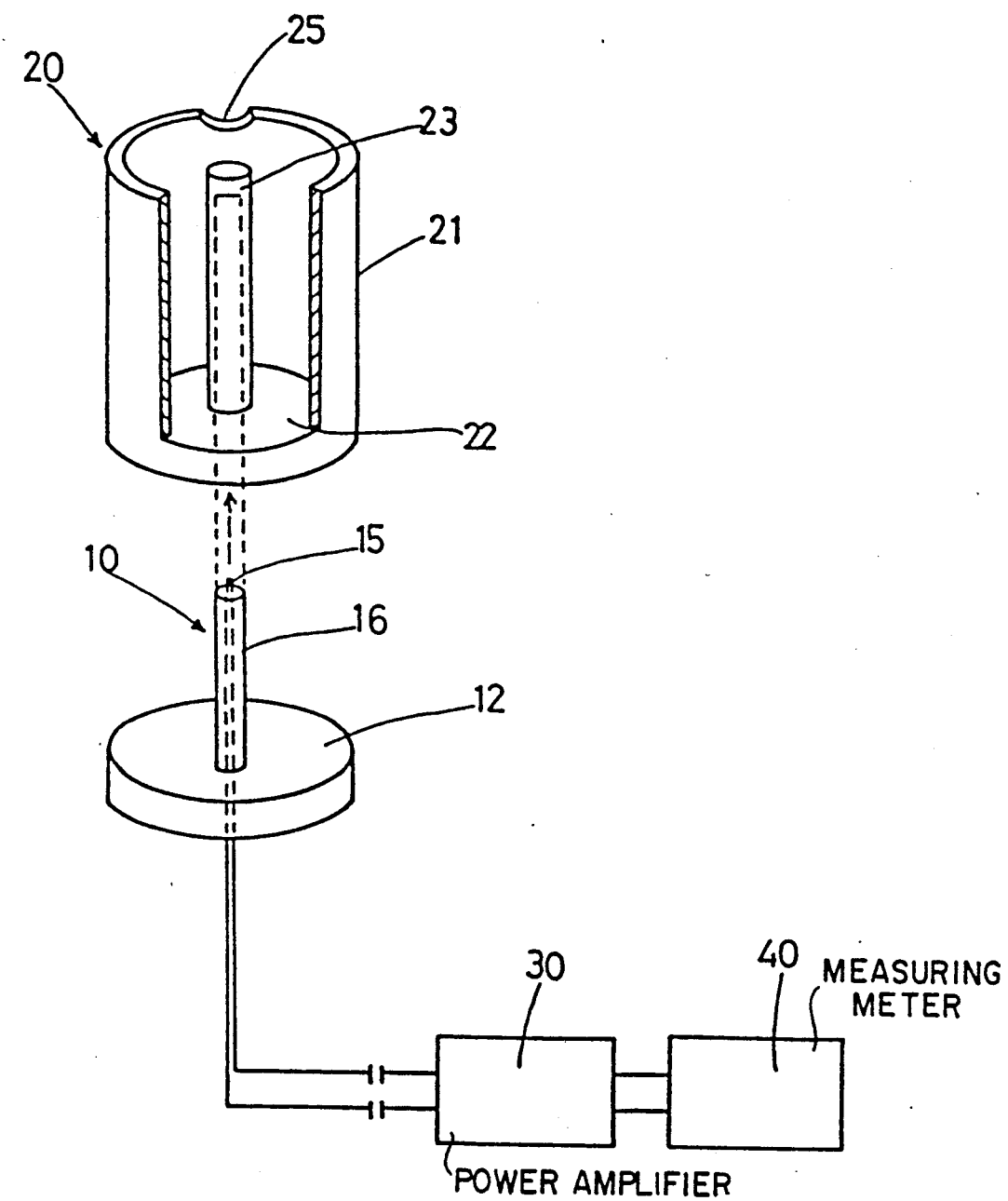
FIG. 1 is a perspective view of a temperature measuring apparatus of molten metal according to one aspect of the present invention.

In FIG. 1 a temperature measuring apparats of molten metal according to the present invention includes a temperature measuring cup (molten metal cup) 20 having therein a temperature measuring member 10. The temperature measuring member 10 is composed of a thermocouple 15 which is covered with a protecting insulator 16. Preferably, the temperature measuring member 10 is secured to a base 12 to vertically extend therefrom, for the purpose of an easy measurement. The thermocouple can be integrally formed with the base. The thermocouple 15 is preferably made of a good refractory material having a high durability, such as an R thermocouple (platinum rhodium 13% platinum thermocouple having a fire resistance against 1400° C.), since the thermocouple 15 of the present invention is repeatedly used. Note that a conventional disposable thermocouple is usually made of an inexpensive K thermocouple (ChromelAlumel thermometer).

Figure 3:
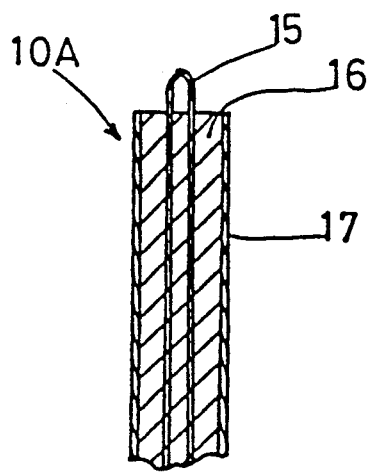
FIG. 3 is a longitudinal sectional view of a main part of a temperature measuring apparatus for measuring the temperature of molten metal, according to another embodiment of the present invention; and, FIG. 4 is a perspective view of a known temperature measuring cup for measuring the temperature of molten metal.
Figure 4:
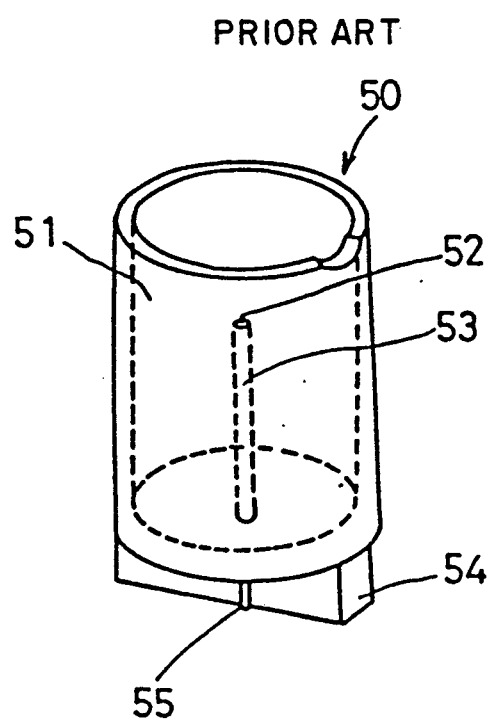

The thermocouple 15 is protected by the protecting insulator 16, as mentioned before. However, during repeated use thereof, there is a possibility of a breakage of the insulator or a deformation of the thermocouple. To minimize such a possibility of breakage or deformation, it is possible to use a thermocouple 10A in which the protecting insulator 16 is covered with a reinforcing metal pipe 17, as shown in FIG. 3.

Figure 2:
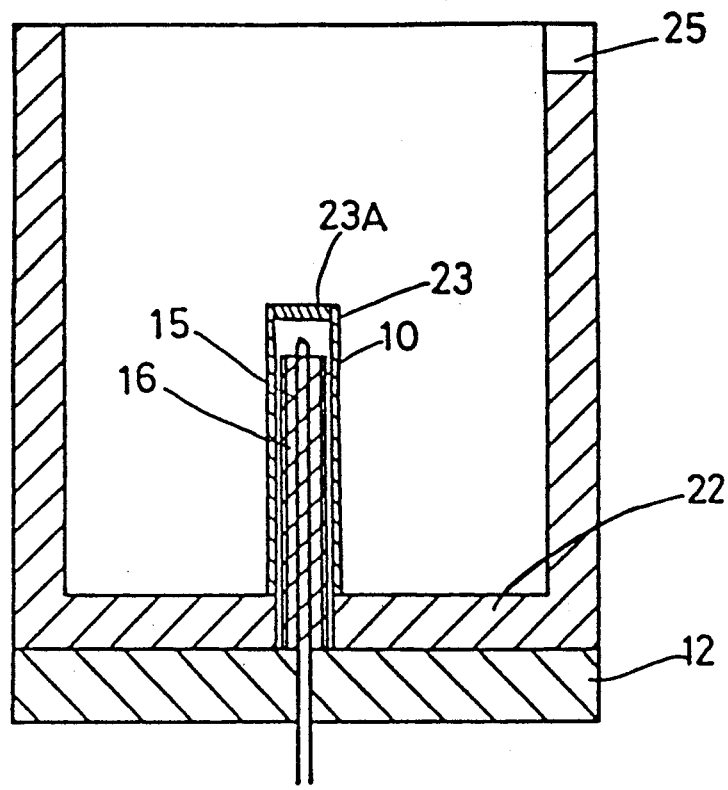
FIG. 2 is a longitudinal sectional view of a main part of the temperature measuring apparatus for measuring the temperature of molten metal shown in FIG. 1, upon measurement.

The molten metal cup 20 has a cylindrical annular cup body 21 which is made of a refractory material known per se and which has a vertically extending straight pipe portion 23 provided on the bottom 22 thereof, so that the temperature measuring member 10 can be inserted in the pipe portion 23. The pipe portion 23 which is made, for example, of a silica tube has a lid 23A (FIG. 2) which closes the upper opening of the pipe portion 23 to prevent molten metal from penetrating into the pipe portion 23. Preferably, the straight pipe portion 23 has a diameter substantially equal to or slightly greater than that of the temperature measuring member 10, so that the latter can be substantially snugly and smoothly inserted in the pipe portion 23, as can be seen in FIG. 2.

Upon measuring the temperature of the molten metal, the cup 20 is located on the base 12 of the temperature measuring member 10, so that the latter is inserted in the pipe portion 23 of the cup 20. A molten metal to be measured is poured in the cup 20.

The cup 20 is provided on its upper edge with a generally U-shaped running gate 25 which is located at a predetermined height relative to the thermocouple 15, so that a constant quantity of molten metal can be always maintained in the cup 20.

In the illustrated embodiment, although an R thermocouple is used as the thermocouple 15, as mentioned before, it is also possible to use a K thermocouple in place of the R thermocouple. In this alternative, however, since there is a difference in thermoelectromotive force between the K thermocouple and the R thermocouple, it is preferable to provide a power amplifier 30 in a measuring circuit to which the thermocouple 15 is connected, as shown in FIG. 1. Namely the provision of the power amplifier 30 makes it possible to use a measuring meter 40 (FIG. 1) for the K thermocouple. Namely, the R thermocouple can be connected to the measuring meter 40 for the K thermocouple through the amplifier 30.

After the measuring is completed, the cup 20 is disengaged from the temperature measuring member 10, so that only the cup 20 is disposed (thrown away). A new molten metal cup 20 is attached to the temperature measuring member 10 for a further measurement.

As can be understood from the foregoing, according to the present invention the molten metal cup is detachably connected to the temperature measuring member and accordingly the consumables are only the molten metal cups. The temperature measuring member which has a relatively expensive thermocouple can be repeatedly used.

Due to the repeated use of the temperature measuring member, the thermocouple can be made of an expensive material having a good quality and a high heat conductivity, resulting in an increased reliability and precision of measurement.

I claim:
1. An apparatus for measuring the temperature of molten metal comprising:
   a temperature measuring member having a thermocouple covered with a protecting insulator and an outer reinforcing pipe;
   a refractory molten metal cup having a cylindrical annular cup body and a closed-end vertically extending pipe portion formed in the cup body such that said temperature measuring member can be repeatably detachably inserted in the pipe portion while preserving the integrity of the pipe portion; and
   a base secured to said temperature measuring member such that said temperature measuring member extends vertically from said base so as to be detachably insertable into the pipe portion of said refractory molten metal cup.

* * * * *